Jan. 13, 1959     J. A. WEEDMAN     2,868,830
SEPARATION BY CRYSTALLIZATION
Filed Oct. 18, 1954
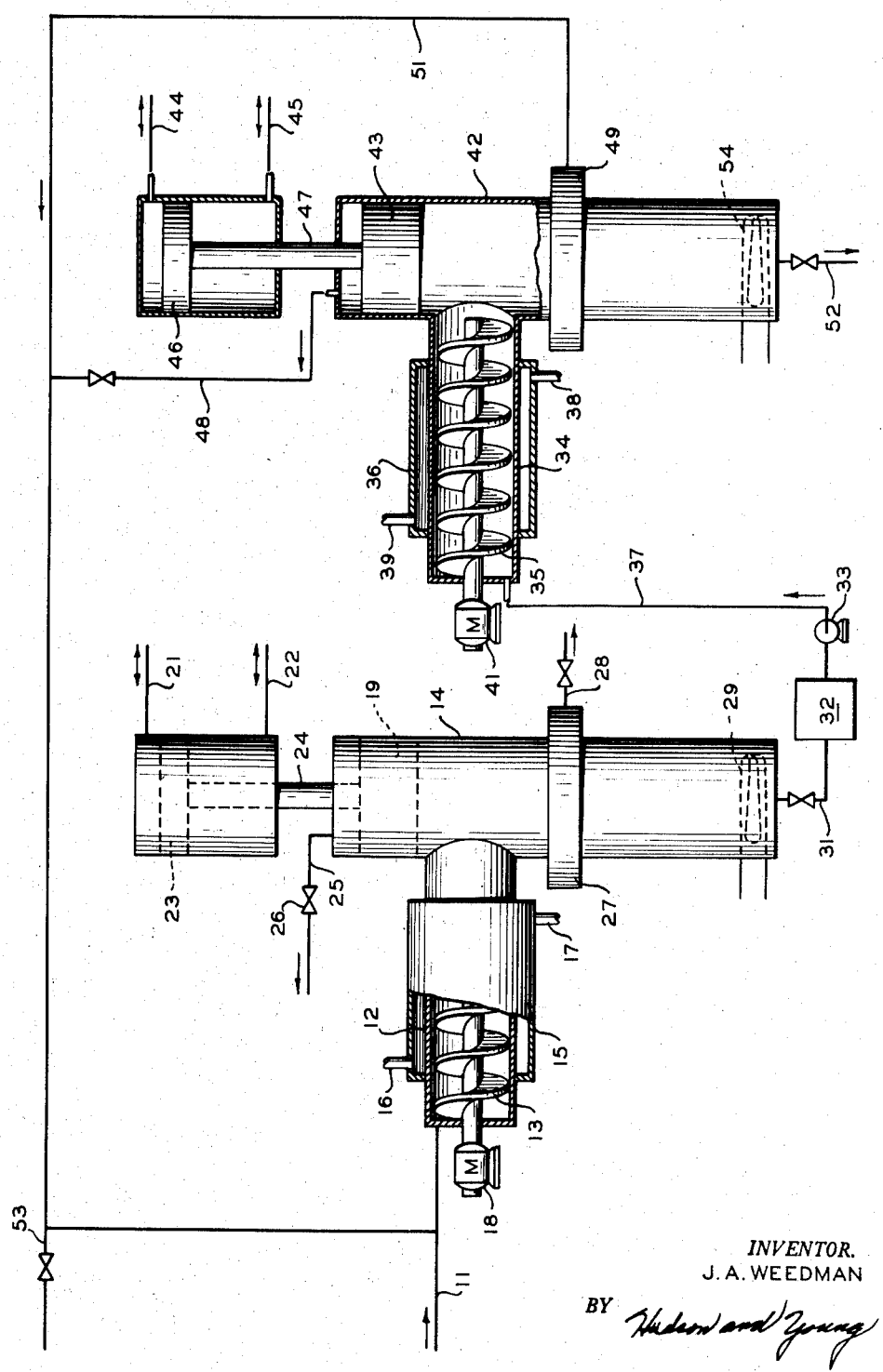
INVENTOR.
J. A. WEEDMAN
BY *Hudson and Young*
ATTORNEYS

United States Patent Office 2,868,830
Patented Jan. 13, 1959

2,868,830

SEPARATION BY CRYSTALLIZATION

John A. Weedman, Bartlesville, Okla., assignor to Phillips Petroleum Company, a corporation of Delaware Application October 18, 1954, Serial No. 462,828

10 Claims. (Cl. 260—475)

This invention relates to separation by crystallization. In one of its more specific aspects, the invention relates to improved apparatus for the separation of components of mixtures by fractional crystallization. In another of its more specific aspects, the invention relates to an improved method for separating the components of mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition. Thus, whereas separation by distillation and extraction becomes more difficult as the purity of the product increases, separation by crystallization becomes easier.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

Methods of separating a pure component from a mixture have been devised whereby the mixture to be separated is introduced into a heat exchange zone wherein a mixture of crystals and liquid is formed and that mixture is then introduced into an elongated purification chamber through which the crystals are moved as a compact mass. One such means for purifying crystals has been disclosed by J. Schmidt, Re. 23,810.

In the process disclosed by J. Schmidt, a mass of crystals is moved through an elongated chamber to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displaced liquid corresponding to the melt improves the purity of the final product is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

In order to separate the constituents of certain mixtures by fractional crystallization, it is necessary to adjust the temperature of the mixture to one which is far below the temperature at which crystals form of any one of the pure constituents. For example, when para-xylene is separated from a mixture of isomeric $C_8$ alkyl benzenes, it is necessary to cool the mixture to a temperature in the neighborhood of about $-57°$ to about $-78°$ C.

When the crystals of para-xylene are introduced into a purification chamber wherein they are moved as a compact mass through the length of the chamber to a melt zone in a manner so as to displace a portion of the melt through at least a portion of the crystal mass, considerable difficulty is encountered. The substantially pure material obtained by melting crystals in the melt zone has, in many instances, such as in the case of para-xylene, a freezing point which is much higher than that of the desired material in admixture with the other components. For example, pure para-xylene has a freezing point of about 13° C. When such a high freezing point material is displaced through at least a portion of a crystal mass which is at a temperature much lower than the freezing point of that material, that relatively pure material freezes in the interstices of the crystal mass to such an extent that it completely closes off further flow of the melt through the compacted crystal mass. I have devised a method whereby continuous operation can be achieved at a high rate without encountering freezing of a solid impervious crystal plug in the purification chamber. This problem is, to my knowledge, only encountered in a system using a purification tube, such as is described hereinafter. This improvement is particularly important since it results in a recovery of a product of high purity at a very high rate.

It is highly desirable for the best operation of such a purification system to remove much of the mother liquor from the crystals before introducing those crystals into the purification chamber. During the formation of the crystals at the low temperatures, small quantities of impurities are trapped within the individual crystals. Thus, in order to obtain the highest purity product, it is desirable to melt a sufficient amount of the crystals to free the trapped liquid impurity. Furthermore, it is desirable to remove the impure materials from the crystal mass at the greatest rate possible so as to shorten the time required to obtain the pure product.

I have devised a means and method whereby occluded impurities are removed from the crystal mass at a high rate. Included impurities are released from the crystals so that the separation of these impurities can be obtained in an ultimate purification chamber, as further disclosed hereinbelow. By my means and method, efficient production is obtained of a product which has 98+ percent purity and, in some cases, even as high as 99.9 percent purity, with very high continuous yields.

The following are objects of the invention.

An object of the invention is to provide an improved system for the separation of a pure component from mixtures. Another object of the invention is to provide an improved process for the separation of a pure component from a mixture. Another object of the invention is to provide a method for rapidly separating a component having a relatively high initial solidification point from a liquid mixture which has a relatively low eutectic solidification point. Another object of the invention is to provide apparatus for rapidly separating a component having a relatively high initial freezing point from a liquid mixture which has a relatively low eutectic freezing point. Another object of the invention is to provide a process which will permit the continued displacement of pure material through at least a portion of a compacted crystal mass. Other and further objects of the invention will be apparent to those skilled in the art upon study of the accompanying disclosure.

Broadly speaking, this invention resides in a method and apparatus for the purification of crystals wherein mother liquor is efficiently removed from the crystals, the crystals are then melted so as to form a phase having not more than 12 percent solids. That phase is then subjected to chilling at a relatively high temperature so as to form crystals of the component which was originally crystallized and leaving the impurities as uncrystallized material. The uncrystallized material is then separated from the crystalline material. The separation of mother liquor and the melting of the crystals is obtained in a first closed elongated chamber wherein a piston is used to compact the crystals so as to displace mother liquor therefrom substantially without reflux and to move the compact crystal mass into heat exchange with heating means, whereby the crystals are melted. The melt is withdrawn from the first chamber at the rate of formation so that substantially no liquid material is displaced into the compact crystal mass. The melted material which is at a temperature considerably higher than that at which it was crystallized in the presence of the other components of the mixture is cooled to a temperature considerably higher than the initial crystallization temperature, but which is still low enough to result in the formation of crystals of a component of the mixture. The crystals formed by the second heat exchange are introduced into a second closed elongated chamber wherein the crystals are compacted and purified as described hereinbelow.

Although, as I have pointed out hereinbefore, this invention is particularly applicable to systems in which the temperature at which crystals form of the desired pure component is considerably higher than the temperature to which the component is cooled in the liquid mixture to form crystals thereof, this procedure can be advantageously utilized in practically any system to which fractional crystallization is applicable so as to increase the efficiency of the process. This invention is applicable to the separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a purity upwards of 98 percent. In order to illustrate some of the systems to which the invention is applicable, the following compounds are grouped with respect to their boiling points:

| | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |
| Group C: | | |
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS$_2$ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-cymene | 176.0 | −73.5 |

| | B. P., °C. | M. P., °C. |
|---|---|---|
| Group H: | | |
| Dimethyl phthalate | 282 | 5.5 |
| Dimethyl isophthalate | 124 (12 mm.) | 67 |
| Dimethyl terephthalate | 288 | 140.6 |
| Group I: | | |
| Ortho-nitrotoluene | 222.3 | α−10.6 / β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture of toluene and/or aniline. Multicomponent systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone, (1,4-benzenediol), paracresol, para-dichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained upon study of the accompanying drawing which is a schematic representation of the improved system of this invention.

Referring particularly to the drawing, a mixture of materials from which at least one constituent is to be separated is fed through conduit 11 to a heat exchanger, such as chiller 12, where the temperature of the mixture is adjusted so as to obtain crystals of at least a portion of at least one of the constituents of the mixture. Chiller 12 can be any conventional type chiller, preferably being of the scraped surface type and which is supplied with refrigeration means that are adequate to lower the temperature of the liquid mixture to that necessary to crystallize at least a portion of at least one of the constituents thereof. It is preferred that scraper 13 in chiller 12 be formed as a helix so as to aid in moving the crystals from the chiller into elongated tube or chamber 14. Chiller 12 may be, as shown in the drawing, supplied with a heat exchange jacket 15 through which cooling fluid is passed by means of conduits 16 and 17. Although this chiller is shown as extending at right angles from chamber 14, it is, in some instances, desirable to position the chiller at an angle so that the crystals are permitted to move by gravity into an upstream portion of chamber 14. Scraper 13 is rotated at the desired speed by means of motor 18. As will be apparent from the discussion hereinbefore, the temperature to which the mixture is adjusted in the heat exchanger will depend entirely upon the specific mixture, since crystals of the various materials form at different temperatures and the temperature at which crystals of a given constituent of a mixture form is dependent upon the constitution of the mixture. When a mixture of isomeric $C_8$ alkyl benzenes is fed through conduit 11 to chiller 12, that mixture is lowered to a temperature in the neighborhood of −57° to −78° C., depending upon the specific concentration of the materials in the mixture.

The mixture of crystals and liquid resulting from the heat exchange of the mixture is fed into chamber 14 wherein the crystals are moved downstream as a compact mass by means of piston 19 which is driven by means of fluid flow through conduits 21 and 22, which fluid acts upon drive piston 23 connected to piston 19 by means of piston rod 24. Piston 19 may be either imperforate or may be provided with a porous face, which face permits the flow of liquid therethrough but which prevents the movement of crystals therethrough. Thus, when piston 19 is perforate, as that piston is moved in a downstream direction so as to move the compact crystal mass downstream through chamber 14, uncrystallized material (mother liquor) is permitted to flow through the face of piston 19 and is removed from the upstream portion of chamber 14 through conduit 25, which is provided with a flow control valve 26. This material can be reprocessed, for example, in a system for the production of para-xylene, the mother liquor can be isomerized so as to form additional para-xylene in the feed which is once again supplied to the system through conduit 11.

In cases where piston 19 is imperforate, it is necessary to provide separate means for removing mother liquor from an upstream end portion of chamber 14. In such an event, it is preferred that a filter 27 with liquid outlet 28 be provided at a point immediately downstream of chiller 12. At least a portion of the crystals is melted, for example, by heater 29, after they have been moved through chamber 14 so as to remove mother liquor therefrom. The compact crystal mass which is moved downstream through chamber 14 by means of piston 19 is at a relatively low temperature. For this reason, it is necessary to operate so that melted material is not displaced into the compact crystal mass. The melt does not carry a sufficient amount of heat to heat the crystal mass sufficiently to keep the melt from being completely frozen in the crystal mass in a manner such as to form a solid, liquid impervious plug.

Heating element 29 is provided in a downstream portion of chamber 14 for heating the crystals and melting at least a major portion thereof at the downstream end of that chamber. Heating element 29, although shown as a heating coil through which the heating material may be passed, may be any conventional means for heating, such as a heating chamber or element wrapped around or enclosing a portion of the lower end of chamber 14 or may be an electrical heating element provided within the downstream portion of that chamber.

After heating, the material which is moved through conduit 31 preferably has no greater than 12 percent solids. This material is at a temperature below that of the solidification point of the desired crystals. That material may be introduced into a container, such as surge tank 32 or such a container may be by-passed and the material pumped by means of pump 33 to a heat exchanger, such as chiller 34 provided with a scraper 35 and refrigeration means, such as a heat exchange jacket 36 enclosing at least a portion of the length of that heat exchanger. Material for cooling the feed supplied by pump 33 through conduit 37 is passed through jacket 36 by means of conduits 38 and 39. Scraper 35 is rotated by means of motor 41. It is preferred that heat exchanger 34 be like that described in connection with heat exchanger 12.

Crystals formed in heat exchanger 34 are introduced into an upstream portion of closed elongated chamber 42 and are moved downstream as a compact mass through that chamber by means of piston 43 which is slideably fitted to operate in at least an upstream portion of chamber 42. Piston 43 is preferably motivated by fluid flow through conduits 44 and 45, which fluid flow actuates drive piston 46, which is in turn connected to piston 43 by means of piston rod 47. Piston 43 is a piston such as described in connection with piston 19. When the face of piston 43 is porous, liquid which is displaced through that face is removed from an upstream portion of chamber 42 through conduit 48. Additional liquid may be removed through filter 49 and conduit 51. When piston 43 is imperforate, all of the noncrystalline material which is removed from an upstream portion of chamber 42 is removed through filter 49 and conduit 51. Chamber 42 is normally operated so that the liquid which is removed from the upstream portion of that chamber has a higher concentration of material corresponding to the material which is recovered from the downstream portion of chamber 42 through conduit 52 than the concentration of that material in the feed.

When the liquid removed from the upstream portion of chamber 42 has such a concentration of the desired product, that material may be returned to heat exchanger 12 where it is reprocessed, thus enriching the feed to that heat exchanger and making possible the formation of larger crystals. If the stream 51 has been enriched sufficiently, it may be withdrawn through conduit 53 for other desired uses. Heating element 54 is provided in a downstream portion of chamber 42 for heating the crystals and melting a portion thereof in the downstream portion of that chamber. Heating element 54, although shown as a heating coil through which the heating material may be passed, may be any conventional means for heating, such as a heating chamber or element wrapped around or enclosing the lower end of chamber 42 or may be an electrical heating element provided within the downstream portion of that chamber.

At least a portion of the crystals which are compacted and moved downstream through chamber 42 by piston 43 are melted in heat exchange with heating element 54 and a portion of the melt is displaced countercurrently through at least a portion of the crystal mass. This material, which is displaced into the crystal mass, displaces occluded impurities therefrom. The displaced occluded impurities are removed from the system through filter 49 and conduit 51.

Although the specific device disclosed in the drawings shows the downstream end of chamber 14 to be closed and the heating element 29 to be provided in the downstream portion of that chamber, it is within the contemplation of this invention that the downstream end of chamber 14 may be open and that the downstream end of the crystal mass may be melted outside of the chamber. When such a modification is used, some means, such as a conventional gate valve, may be advantageously used to close the downstream portion of chamber 14 until the crystals have been assembled in a compact mass, after which the valve will be operated in an open position.

The following example is presented to exemplify the invention but should not be utilized to unduly limit the invention.

*Example*

A feed having a concentration of 20 percent by weight of para-xylene, the remainder being a mixture of isomeric $C_8$ alkyl benzenes, is cooled to a temperature of $-73°$ C. whereby para-xylene is crystallized. The chilled material is then introduced into a column and the crystallized material is compacted by means of a piston reciprocating in the upstream end portion of the chamber. Mother liquor containing 6 percent para-xylene is removed from an upstream portion of the chamber. The piston is operated under a compacting pressure of 500 pounds per square inch and a piston pressing time of one-half minute. The crystal mass is heated at the downstream end of the column so as to melt the crystals and the melted material is removed from the chamber at a rate of 100 gallons per hour and has a concentration of para-xylene of about 71.5 weight percent. The material removed from the downstream portion of the chamber is removed at such a rate that substantially no reflux of melted material through the crystal mass takes place. That material is then chilled at a temperature of about $-23°$ C. whereby a portion of the para-xylene is crystallized and the chilled material is then introduced into an upstream portion of a second chamber and the crystals are moved through that chamber by means of a piston reciprocating in the upstream portion of the chamber. Liquid material having a concentration of about 54 percent by weight para-xylene is removed from an upstream portion of that chamber and is recycled to enrich the feed to the initial chiller. This chamber also is operated at a piston compacting pressure of 500 pounds per square inch and a piston pressing time of one-half minute. Crystals are melted in the downstream portion of that chamber and a small portion of the melt is displaced into the crystal mass so as to displace occluded impurities therefrom. A product stream containing about 98 percent by weight para-xylene is removed from the downstream portion of the chamber at a rate of about 40 gallons per hour.

It will be apparent to those skilled in the art that various modifications of this invention can be made upon studying the accompanying disclosure. Such modifications are believed to be clearly within the spirit and the scope of this invention.

I claim:

1. A process for the purification of crystals of an organic compound purifiable by fractional crystallization which process comprises moving said crystals and associated impurities toward one end of a first elongated zone as a compact mass; melting a portion of said crystals at the downstream end portion of said first elongated zone; compacting said crystals in said zone without substantial reflux of melt from the downstream end of said zone into said crystal mass; chilling liquid material from the downstream end of said first elongated zone so as to form crystals of at least a portion of one constituent of said mixture at a temperature higher than the temperature of the crystal material in said first zone; introducing said newly formed crystals into a second elongated zone; moving said crystals toward one end of said zone as a compact mass; melting at least a portion of said crystals in the downstream end portion of said second zone; displacing a portion of the resulting melt countercurrently through a portion of said crystal mass so as to displace occluded impurities therefrom; removing said displaced materials from an upstream portion of said second zone; and removing a purified product from the downstream portion of said second zone.

2. The process of claim 1 wherein said mixture comprises para- and meta-xylenes.

3. The process of claim 1 wherein said mixture comprises dimethyl isophthalate and dimethyl terephthalate.

4. The process of claim 1 wherein said mixture comprises para- and meta-cymenes.

5. The process of claim 1 wherein said mixture comprises para- and meta-nitrotoluenes.

6. The process of claim 1 wherein said mixture comprises cyclohexane and 2,2-dimethylpentane.

7. A process for the purification of para-xylene crystals which comprises moving said crystals at a temperature within the range of from $-57°$ to $-78°$ C., toward one end of a first elongated zone as a compact mass; melting a portion of said crystals at the downstream end portion of said first elongated zone; compacting said crystals in said zone without substantial reflux of melt from the downstream end of said zone into said crystal mass; chilling liquid material from the downstream end of said first elongated zone so as to form crystals of at least a portion of one constituent of said mixture at a temperature higher than the temperature of the crystal material in said first zone; introducing said newly formed crystals into a second elongated zone; moving said crystals toward one end of said zone as a compact mass; melting at least a portion of said crystals in the downstream end portion of said second zone; displacing a portion of the resulting melt countercurrently through a portion of said crystal mass so as to displace occluded impurities therefrom; removing said displaced materials from an upstream portion of said second zone; and removing a purified para-xylene product from the downstream end portion of said second zone.

8. A process for the purification of para-xylene crystals which comprises moving said crystals at a temperature within the range of from $-57°$ to $-78°$ C. toward one end of a first elongated zone as a compact mass; melting said crystals at the downstream end portion of said first elongated zone so as to leave not more than 12 percent solids; compacting said crystals in said zone without substantial reflux of melt from the downstream end of said zone into said crystal mass; chilling liquid material from the downstream end of said first elongated zone so as to form crystals of at least a portion of one constituent of said mixture at a temperature higher than the temperature of the crystal material in said first zone; introducing thus newly formed crystals into a second elongated zone; moving said crystals toward one end of said zone as a compact mass; melting at least a portion of said crystals in the downstream end portion of said second zone; displacing a portion of the resulting melt countercurrently through a portion of said crystal mass so as to displace occluded impurities therefrom; removing said displaced materials from an upstream portion of said second zone; and removing a purified para-xylene product from the downstream end portion of said second zone.

9. The process of claim 8 wherein said mixture comprises para- and meta-xylenes.

10. Apparatus for crystal purification which comprises a first substantially unobstructed elongated tube; means for adjusting the temperature of a liquid mixture to form crystals of at least one component of said liquid mixture, said means being operatively connected to an upstream portion of said first tube; means in the upstream portion of said first tube for moving crystals as a compact mass through said tube; means for withdrawing liquid from an upstream portion of said first tube; means for melting crystals at the downstream end of said first tube; a second elongated tube; second means for adjusting the temperature of a liquid mixture to form crystals of a component thereof, means for withdrawing melted crystals from said first tube operatively connected to the downstream end portion of said tube and said second temperature-adjusting means, means for introducing material from the second temperature adjusting means into an upstream portion of said second tube; means in the upstream portion of said second tube for moving crystals as a compact mass through said second tube; liquid outlet means from an upstream portion of said second tube; heating means operatively connected to a downstream portion of said second tube; means, cooperative with said means for moving crystals, to restrict flow of fluid from the downstream portion of said second tube and thus produce reflux of melt produced by said heating means; and purified product outlet means in a downstream portion of said second tube.

References Cited in the file of this patent
UNITED STATES PATENTS

| | | |
|---|---|---|
| 2,540,977 | Arnold | Feb. 6, 1951 |
| 2,683,178 | Findlay | July 6, 1954 |
| 2,747,001 | Weedman | May 22, 1956 |